United States Patent
Steinhausler et al.

(10) Patent No.: US 6,759,466 B2
(45) Date of Patent: Jul. 6, 2004

(54) MOLDING COMPOSITIONS HAVING IMPROVED PROPERTIES

(75) Inventors: Thomas Steinhausler, Collierville, TN (US); John J. Young, Valparaiso, IN (US); Thomas J. Folda, Collierville, TN (US); Thomas C. Kendrick, Jr., Cordova, TN (US)

(73) Assignee: AOC, L.L.C., Collierville, TN (US)

( * ) Notice: Subject to any disclaimer, the term of this patent is extended or adjusted under 35 U.S.C. 154(b) by 0 days.

(21) Appl. No.: 10/268,402

(22) Filed: Oct. 9, 2002

(65) Prior Publication Data

US 2003/0092823 A1 May 15, 2003

Related U.S. Application Data

(60) Provisional application No. 60/336,959, filed on Oct. 26, 2001.

(51) Int. Cl.$^7$ ............................ C08K 3/34; C08G 63/91
(52) U.S. Cl. .................. 524/492; 524/445; 524/426; 524/430; 524/451; 525/43; 525/44
(58) Field of Search ................... 524/430, 437, 524/441, 442, 445, 449, 451, 492, 493, 494, 495

(56) References Cited

U.S. PATENT DOCUMENTS

| | | |
|---|---|---|
| 4,280,949 A | 7/1981 | Dieck |
| 4,540,741 A | 9/1985 | Corrado |
| 4,769,436 A | 9/1988 | Beck et al. |
| 5,094,797 A * | 3/1992 | Heel et al. .................. 264/349 |
| 5,116,917 A | 5/1992 | Chang et al. |
| 5,236,976 A | 8/1993 | Michaels |
| 5,342,554 A | 8/1994 | McBain et al. |
| 5,443,775 A | 8/1995 | Brannon |
| 5,491,184 A | 2/1996 | McBain et al. |
| 5,521,232 A | 5/1996 | Gynn et al. |
| 5,747,607 A | 5/1998 | Hager et al. |

OTHER PUBLICATIONS

Weather Stabilization and Pigmentation of UV–Curable Powder Coatings, Misev et al., *Journal of Coatings Technology*, vol. 71, No. 891, Apr. 1999, pp. 37–44.

* cited by examiner

*Primary Examiner*—Katarzyna Wyrozebski
(74) *Attorney, Agent, or Firm*—Baker, Donelson, Bearman, Caldwell & Berkowitz

(57) ABSTRACT

Molding compositions for sheet and bulk molded products having improved toughness comprise an unsaturated polyester, a monomer which is copolymerizable with the polyester, a thermoplastic polymer, a filler and a reinforcing agent.

30 Claims, No Drawings

MOLDING COMPOSITIONS HAVING IMPROVED PROPERTIES

This application claims the benefit of U.S. Provisional Application Serial No. 60/336,959, filed Oct. 26, 2001.

TECHNICAL FIELD

The present invention relates to molding compositions having improved properties. In a more specific aspect, this invention relates to molding compositions which, when molded, provide products with increased toughness. This invention also relates to a process for the manufacture of these molding compositions.

BACKGROUND OF THE INVENTION

Molding compositions have been manufactured and used for many years in forming various articles. Examples of these compositions include sheet molding compositions (SMC) and bulk molding compositions (BMC).

However, the prior art molding compositions often experience problems with paint pops and edge pops on parts molded from sheet molding compositions. These problems can be attributed to the toughness of the resin contained in the SMC.

In further illustration of these problems, a molded part is commonly hot when removed from the press: After removal, the hot molded part is placed on a conveying device for movement to the next processing step (priming, painting, etc.) As the molded part is generally not handled gently during this process, there is an opportunity for microscopic cracks to form in the molded part. These micro-cracks are responsible for the paint pops and edge pops after the molded part is painted.

The toughness of the molding composition is generally achieved by careful selection of the building blocks of the molding composition. Currently, the toughness in molding compositions is imparted either by the addition of rubber particles or the use of vinyl esters in the molding compositions. Rubber particles are disadvantageous due to their need to be stabilized with emulsifiers to stay in homogeneous solution. Vinyl esters add cost to the molding compositions.

Examples of prior art efforts to improve the toughness of molding compositions include U.S. Pat. No. 5,116,917 (1992) which describes a thermosettable vinyl ester resinous composition and a low profile additive which is a non-gelling, saturated polyester.

U.S. Pat. No. 5,491,184 (1996) describes unsaturated polyester-modified flexible copolymers for use in sheet molding compositions.

U.S. Pat. No. 5,342,554 (1994) describes vinyl-terminated polyesters and vinyl-terminated polycarbonates which improve the flexibility and toughness of compositions made from unsaturated polyesters and fiber-reinforced plastics made from unsaturated polyesters.

Therefore, there is a need in the industry for molding compositions which will provide increased toughness to the molded products.

SUMMARY OF THE INVENTION

Briefly described, the present invention provides tough molding compositions for the manufacture of sheet molded products and bulk molded products. The present invention also provides a process for the manufacture of these tough molding compositions.

Accordingly, an object of this invention is to provide molding compositions.

Another object of this invention is to provide molding compositions for sheet molded products and bulk molded products.

Another object of this invention is to provide molding compositions which, when molded, provide products with increased toughness.

Still another object of this invention is to provide a process for the manufacture of molding compositions.

Still another object of this invention is to provide a process for the manufacture of molding compositions for sheet molded products and bulk molded products.

Still another object of this invention is to provide a process for the manufacture of molding compositions which, when molded, provide products with increased toughness.

These and other objects, features and advantages of this invention will become apparent from the following detailed description.

DETAILED DESCRIPTION OF THE INVENTION

The present invention provides a new and unique molding composition which comprises a modified, unsaturated, uncured, curable polyester; a monomer which will copolymerize with the polyester; a thermoplastic polymer; a filler; and a reinforcing agent.

The present invention also provides a process for the manufacture of these new and unique molding compositions.

As used in this application, the term "new and unique" will be understood as referring to the increased toughness which is imparted to sheet and bulk molded products made from the compositions of this invention.

Of course, depending upon the intended use, the molding compositions of this invention may optionally contain other additives, such as dyes, pigments, thickening agents, viscosity reducers, inhibitors, mold release agents, catalysts, etc.

The molding compositions of this invention can be molded into various products, including sheet and bulk parts, such as automotive bumpers, hoods, decklids, fenders, etc.

The polyester used in this invention is an unsaturated polyester in which one of the structural units (also referred to a building block) is a long chain polyol having the following structural formula:

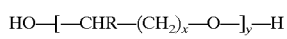

in which R is hydrogen or methyl, X is an integer from 1–4, and y is an integer from 2–50.

One or more of these polyols can be used. A preferred polyol is poly (1,2-propylene glycol) having a molecular weight of about 400 to about 2900, preferably about 600 to about 800. A copolymer of two or more of these polyols can also be used.

We have found that careful use of these long chain polyols imparts flexibility to the polyester but not at the expense of the desired property of toughness.

As known in the industry, the term "toughness" can have different definitions and standards. For purposes of this invention, the term "increased toughness" will be understood to mean that products molded from the compositions of this invention are more resistant to mechanical influences (such as bending, twisting, etc.) than standard molding compositions (i.e., compositions which are not of this invention).

The unsaturated polyesters (sometimes referred to as polyester alkyds) useful in this invention are a class of soluble, linear, low molecular weight (from about 5,000 to about 15,000) materials which contain both carboxylic ester groups and carbon-carbon double bonds as recurring units along the main polymer chain. These polyesters may be prepared by condensation of long chain polyols (as described above), diols, ethylenically unsaturated dicarboxylic acids or anhydrides (to impart the unsaturation) and saturated dicarboxylic acids (to modify the polymer). As stated above, the use of a long chain polyol imparts flexibility to the polyester.

The monomer used in this invention can be mono- or poly-functional but must be copolymerizable with the polyester. Preferred monomers are styrene, alpha-methyl styrene, chlorostyrene, vinyl toluene, divinyl benzene, methyl methacrylate and mixtures thereof.

A third essential part of the molding compositions of this invention is a thermoplastic polymer (also referred to as a low profile additive). These thermoplastic polymers are commercially available products and are especially useful in producing molded articles having a Class A surface (necessary for molded automotive parts). Many thermoplastic polymers can be used in this invention, including saturated polyesters, vinyl polymers, polymethacrylates and mixtures thereof. Preferred thermoplastic polymers are saturated polyesters, polystyrene, poly(vinyl acetate), poly (methylmethacrylate) and mixtures thereof.

The molding compositions of this invention also contain a reinforcing agent. Specific suitable reinforcing agents are made from glass, carbon, cellulose and synthetic organic fibers such as polyethylene, polycarboxylic esters, polycarbonates, polyamides and mixtures thereof.

The molding compositions of this invention also contain a filler. Preferred fillers are alumina trihydrate, alumina powder, aluminosilicate, baruim sulfate, calcium carbonate, calcium silicate, calcium sulfate, clay, dolomite, glass spheres, limestone dust, mica, quartz powder, crushed silica, talc and mixtures thereof.

The preferred ranges for the components of the molding compositions of the present inventions are as follows:

Modified, unsaturated polyester: 30–45 phr; 6–15% (of total molding composition)

Monomer: 30–45 phr; 6–12%

Thermoplastic polymer: 20–35 phr; 4–12%

Filler: 160–235 phr; 40–60%

Reinforcing agent: not stated in phr; 20–40%

In the above listing and throughout this application, the term "phr" or "PHR" refers to parts per hundred parts of resin (that is, the modified, unsaturated polyester).

For comparison purposes to illustrate the advantages of this invention, the following Tables 1–3 illustrate a standard Class A SMC formulation (Table 1), a Class A SMC formulation using a tough unsaturated polyester and a non-optimized low profile additive package (Table 2) and an optimized tough Class A SMC formulation with a saturated polyester low profile additive (Table 3). Table 1 shows a standard molding composition not prepared according to the present invention. Tables 2 and 3 show a tough molding composition prepared according to the present invention.

The results of the evaluation of the performance of the Class A SMC formulations (Table 4) show a significant decrease in the number of paint pops per panel on the tough SMC compositions of this invention. Under conditions in which no stress is applied to the panel during and between each step, demolding, conductive priming and painting of the panel, the number of paint pops is the same with finished panels of all systems described. If the panel is stressed (bent) after demolding, the tough SMC compositions of this invention show a significant reduction in paint pops in the finished painted part. The data in Table 4 clearly shows that parts made from the tough SMC compositions of this invention lead to less rework and scrap in an industrial environment where parts are being transferred from the mold to the paint operation, during which manual and mechanical stresses to the part are unavoidable.

Sheet molding compounds are prepared by using the components listed in Tables 1–3. In Table 1, the unsaturated polyester resin A is a styrene solution of an unsaturated polyester synthesized from propylene glycol and maleic anhydride. The styrene solution contains 30 weight percent of styrene and has a viscosity of 1220 cps at a temperature of 25° C. and an acid value of 16.5. The polyvinyl acetate solution comprises 40 weight parts of vinyl acetate polymer and 60 weight parts of styrene.

In Table 2, the unsaturated polyester resin B is a styrene solution of an unsaturated polyester synthesized from 0.8 moles of propylene glycol, 0.2 moles of poly(propylene glycol) and 1.0 mole of maleic anhydride. The styrene solution contains 36 weight percent of styrene and has a viscosity of 1050 cps at a temperature 25° C. and an acid value of 16.2.

In Table 3, the saturated polyester resin C is a styrene solution of a saturated polyester synthesized from 0.6 moles of ethylene glycol, 0.4 moles of diethylene glycol and 1.0 mole of adipic acid. The styrene solution contains 40 weight percent of styrene and has a viscosity of 1350 cps at a temperature 25° C. and an acid value of 3.5.

In Table 1–3, the Thickener Solution CT-01225 is magnesium oxide solution, and the Inhibitor Solution CT-INH5 is a parabenzoquinone solution.

3 mm thick 18 inch by 18 inch flat panels are molded and cut into 3 inch by 18 inch panels. For non-stressed parts, the panels are then primed with conductive primer and painted with automotive paint. For stressed parts, the panels are manually bent around a standard one gallon paint can (165 mm diameter) and, after relaxation, primed with conductive primer and painted with automotive paint. The number of paint pops on each panel is counted visually and recorded in Table 4.

TABLE 1

| Material | PHR | Grams |
| --- | --- | --- |
| Polyester A | 54.5 | 5278.7 |
| Ethylene Glycol | 0.3 | 15.3 |
| Inhibitor Solution CT-INH5 | 2.0 | 16.2 |
| Divinylbenzene | 5.4 | 315.7 |
| PVAc Solution | 39.6 | 110.6 |
| Peroxide Catalyst | 2.0 | 119.4 |
| Calcium Stearate | 3.8 | 221.9 |
| Calcium Carbonate | 190.5 | 11238.8 |
| Thickener Solution CT-01225 | 18.5 | 1088.6 |
| Glass Fibers | 29% | |

TABLE 2

| Material | PHR | Grams |
| --- | --- | --- |
| Polyester B | 50.1 | 2958.3 |

TABLE 2-continued

| Material | PHR | Grams |
| --- | --- | --- |
| Inhibitor Solution CT-INH5 | 2.6 | 152.8 |
| Divinylbenzene | 1.5 | 87.9 |
| Peroxide Catalyst | 2.6 | 152.8 |
| Polyacrylate Solution in Styrene | 30.2 | 1784.2 |
| PVAc Solution | 10.1 | 595.3 |
| Water | 0.04 | 2.4 |
| Zinc Stearate | 2.0 | 112.9 |
| Calcium Carbonate | 224.8 | 13263.2 |
| Thickener Solution CT-01225 | 4.4 | 259.6 |
| Isocyanate Thickener | 8.0 | 472.0 |
| Glass Fibers | 29% | |

TABLE 3

| Material | PHR | Grams |
| --- | --- | --- |
| Polyester B | 50.1 | 2958.3 |
| Inhibitor Solution CT-INH5 | 2.6 | 152.8 |
| Peroxide Catalyst | 2.6 | 152.8 |
| Saturated Polyester C | 41.8 | 2467.4 |
| Water | 0.04 | 2.4 |
| Calcium Stearate | 4.5 | 251.4 |
| Calcium Carbonate | 224.8 | 13263.2 |
| Thickener Solution CT01225 | 4.6 | 271.4 |
| Isocyanate Thickener | 8.0 | 472.0 |
| Glass Fibers | 29% | |

TABLE 4

| SMC Formulation | Paint Pops per Panel (non-stressed) | Paint Pops per Panel (stressed) |
| --- | --- | --- |
| Standard Class A (see Table 1) | 5 | 139 |
| Tough Class A (see Table 2) | 6 | 19 |
| Opt. Tough Class A (see Table 3) | 5 | 6 |

This invention has been described in detail with particular reference to certain embodiments, but variations and modifications can be made without departing from the spirit and scope of the invention as defined in the following claims.

What is claimed is:

1. A thermosetting molding composition for use in the manufacture of molded products which have increased toughness, wherein the molding composition comprises:
   A. a modified, unsaturated, uncured, curable polyester, wherein from about 3 to about 35 weight percent of the modified polyester is a long chain polyol;
   B. a monomer which will copolymerize with the polyester;
   C. a thermoplastic polymer;
   D. a filler; and
   E. a reinforcing agent.

2. A molding composition as defined by claim 1 wherein the long chain polyol is poly (1,2-propylene glycol) having a molecular weight of about 400 to about 2900.

3. A molding composition as defined by claim 1 wherein the long chain polyol is poly (1,2-propylene glycol) having a molecular weight of about 600 to about 800.

4. A molding composition as defined by claim 1 wherein a copolymer of two or more chain polyols is a structural unit of the modified polyester.

5. A molding composition as defined by claim 1 wherein about 6 to about 15 percent of the molding composition is comprised of the modified polyester.

6. A molding composition as defined by claim 1 wherein the monomer is styrene, alpha-methylstyrene, chlorostyrene, vinyl toluene, divinylbenzene, methyl methacrylate or a mixture thereof.

7. A molding composition as defined by claim 1 wherein about 6 to about 12 percent of the molding composition is comprised of the monomer.

8. A molding composition as defined by claim 1 wherein the thermoplastic polymer is a saturated polyester, polystyrene, poly (vinyl acetate), poly (methyl methacrylate) or a mixture thereof.

9. A molding composition as defined by claim 1 wherein about 4 to about 12 percent of the molding composition is comprised of the thermoplastic polymer.

10. A molding composition as defined by claim 1 wherein the filler is alumina trihydrate, alumina powder, aluminosilicate, barium sulfate, calcium carbonate, calcium silicate, clay, dolomite, glass spheres, limestone dust, mica, quartz powder, crushed silica, talc or a mixture thereof.

11. A molding composition as defined by claim 1 wherein about 40 to about 60 percent of the molding composition is the filler.

12. A molding composition as defined by claim 1 wherein the reinforcing agent is fibers of glass, carbon, cellulose, polyethylene, polycarboxylic esters, polycarbonates, polyamides or a mixture thereof.

13. A molding composition as defined by claim 1 wherein about 20 to about 40 percent of the molding composition is comprised of the reinforcing agent.

14. A process for the manufacture of a thermosetting molding composition for use in the manufacture of molded products which have increased toughness, wherein the process comprises the steps of mixing:
   A. a modified, unsaturated, uncured, curable polyester, wherein from about 3 to about 35 weight percent of the modified polyester is a long chain polyol;
   B. a monomer which will copolymerize with the polyester;
   C. a thermoplastic polymer;
   D. a filler; and
   E. a reinforcing agent.

15. A process as defined by claim 14 wherein the modified polyester is dissolved in styrene and contains poly (1,2-propylene glycol) as a structural unit.

16. A process as defined by claim 15 wherein the modified polyester has a molecular weight of about 5,000 to about 15,000.

17. A process as defined by claim 15 wherein the poly (1,2-propylene glycol) has a molecular weight of about 400 to about 2,900.

18. A process as defined by claim 15 wherein the amount of poly (1,2-propylene glycol) is about 3 to about 35 weight percent of the modified polyester.

19. A process as defined by claim 14 wherein a copolymer of two or more long chain polyols is a structural unit of the modified polyester.

20. A process as defined by claim 14 wherein about 6 to about 15 percent of the molding composition is comprised of the modified polyester.

21. A process as defined by claim 14 wherein the monomer is styrene, alpha-methylstyrene, chlorostyrene, vinyl toluene, divinylbenzene, methyl methacrylate or a mixture thereof.

22. A process as defined by claim 14 wherein about 6 to about 12 percent of the molding composition is comprised of the monomer.

23. A process as defined by claim 14 wherein the thermoplastic polymer is a saturated polyester, polystyrene, poly (vinyl acetate), poly (methyl methacrylate) or a mixture thereof.

24. A process as defined by claim 14 wherein about 4 to about 12 percent of the molding composition is comprised of the thermoplastic polymer.

25. A process as defined by claim 14 wherein the filler is alumina trihydrate, alumina powder, aluminosilicate, barium sulfate, calcium carbonate, calcium silicate, clay, dolomite, glass spheres, limestone dust, mica, quartz powder, crushed silica, talc or a mixture thereof.

26. A process as defined by claim 14 wherein about 40 to about 60 percent of the molding composition is the filler.

27. A process as defined by claim 14 wherein the reinforcing agent is fibers of glass, carbon, cellulose, polyethylene, polycarboxylic esters, polycarbonates, polyamides or a mixture thereof.

28. A process as defined by claim 14 wherein about 20 to about 40 percent of the molding composition is comprised of the reinforcing agent.

29. A process as defined by claim 15 wherein the poly (1,2-propylene glycol) has a molecular weight of about 600 to about 800.

30. A molding composition as defined by claim 1 wherein the modified polyester has a molecular weight of about 5,000 to about 15,000.

\* \* \* \* \*